United States Patent
Park et al.

(10) Patent No.: US 12,122,941 B2
(45) Date of Patent: Oct. 22, 2024

(54) LIQUID METAL PRECURSOR SOLUTION, METHOD FOR MANUFACTURING METAL FILM USING THE SAME, AND ELECTRONIC DEVICE INCLUDING THE SAME

(71) Applicant: KOREA ADVANCED INSTITUTE OF SCIENCE AND TECHNOLOGY, Daejeon (KR)

(72) Inventors: Steve Park, Daejeon (KR); Hyeonji Kim, Daejeon (KR); Gun-Hee Lee, Daejeon (KR); Jae-Woong Jeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 299 days.

(21) Appl. No.: 17/561,373

(22) Filed: Dec. 23, 2021

(65) Prior Publication Data
US 2022/0315773 A1    Oct. 6, 2022

(30) Foreign Application Priority Data

Apr. 2, 2021   (KR) .................. 10-2021-0043378
Oct. 27, 2021  (KR) .................. 10-2021-0144675

(51) Int. Cl.
| | |
|---|---|
| *H01B 1/22* | (2006.01) |
| *C09D 5/24* | (2006.01) |
| *C09D 7/20* | (2018.01) |
| *C09D 7/62* | (2018.01) |
| *C09D 181/08* | (2006.01) |
| *H01B 5/14* | (2006.01) |
| *C08K 9/04* | (2006.01) |

(52) U.S. Cl.
CPC .............. *C09D 5/24* (2013.01); *C09D 7/20* (2018.01); *C09D 7/62* (2018.01); *C09D 181/08* (2013.01); *H01B 1/22* (2013.01); *H01B 5/14* (2013.01); *C08K 9/04* (2013.01)

(58) Field of Classification Search
CPC ... C09D 5/24; C09D 7/20; C09D 7/62; C09D 181/08; H01B 1/22; H01B 5/14; C08K 9/04
See application file for complete search history.

(56) References Cited

U.S. PATENT DOCUMENTS

2018/0171159 A1*  6/2018  Ooi .................. B22F 1/0545
2022/0262538 A1*  8/2022  Li ...................... H01B 1/22

FOREIGN PATENT DOCUMENTS

| JP | 2017-525840    | 9/2017 |
| KR | 10-2018-0056949 | 5/2018 |

OTHER PUBLICATIONS

Photo-Patternable, large-area solid-state liquid metal film coated via solution shearing for soft electronics, Lee et al., Research Square, Apr. 2021, p. 1-23.*
Bin Yao et al., "Highly Stretchable Polymer Composite with Strain-Enhanced Electromagnetic Interference Shielding Effectiveness", *Advanced Materials*, 2020, 1907499, 7 pages.

* cited by examiner

*Primary Examiner* — Haidung D Nguyen

(57) ABSTRACT

The present disclosure provides a liquid metal precursor solution, including: metal precursor particles including metal particles and a polymer film surrounding the metal particles; and a solvent mixed with the metal precursor particles, wherein each of the polymer film and the solvent includes a functional group having electrostatic repulsion force to each other so that the metal precursor particles may be dispersed in the solvent.

10 Claims, 14 Drawing Sheets

LIQUID METAL PRECURSOR SOLUTION, METHOD FOR MANUFACTURING METAL FILM USING THE SAME, AND ELECTRONIC DEVICE INCLUDING THE SAME

CROSS-REFERENCE TO RELATED APPLICATION

This application claims priority of Korean Patent Application No. 10-2021-0043378, filed on Apr. 2, 2021, and priority of Korean Patent Application No. 10-2021-0144675, filed on Oct. 27, 2021, in the KIPO (Korean Intellectual Property Office), the disclosure of which is incorporated herein entirely by reference.

BACKGROUND OF THE INVENTION

Field of the Invention

The present disclosure relates to a liquid metal precursor solution, a method for manufacturing a metal film using the same, and an electronic device including the same. Particularly, the present disclosure relates to a liquid metal precursor solution, which is amenable to a large-area process, can be applied to a flexible device and has excellent stability against external conditions, a method for manufacturing a metal film using the same, and an electronic device including the same.

Description of the Related Art

Liquid metal has high conductivity, one of the metal characteristics, and simultaneously has flexibility, one of the liquid characteristics, and thus is advantageous in that it may be used as an electrode of a flexible device.

However, realization of a conductor using liquid metal according to the related art merely provides a single layer structure due to low stability, requires a cover for protecting an electrode, or has a limitation in practical application to flexible devices, due to a limitation that a large-area process is not possible.

SUMMARY OF THE INVENTION

A technical problem to be solved by the present disclosure is to provide a liquid metal precursor solution, which can be applied to a flexible device with a large area, and a method for manufacturing a metal film using the same.

In one general aspect of the present disclosure, there is provided a liquid metal precursor solution, including: metal precursor particles including metal particles and a polymer film surrounding the metal particles; and a solvent mixed with the metal precursor particles, wherein each of the polymer film and the solvent includes a functional group having electrostatic repulsion force to each other so that the metal precursor particles may be dispersed in the solvent.

According to an embodiment of the present disclosure, the polymer film includes sulfonate, and the solvent includes carboxylate.

In another general aspect of the present disclosure, there is provided a method for preparing the liquid metal precursor solution, including the steps of: mixing the metal particles and the polymer film with the solvent to provide a mixed solution; and subjecting the mixed solution to ultrasonication.

According to an embodiment of the present disclosure, the metal precursor particles have a size determined depending on the time of ultrasonication, the metal particle is gallium indium, and the polymer film is polystyrene sulfonate (PSS).

In still another general aspect of the present disclosure, there is provided a method for manufacturing a metal film, including the steps of: coating the metal precursor solution on a substrate through a solution process; and carrying out evaporation of the solvent of the coated metal precursor solution.

According to an embodiment of the present disclosure, the metal film has physical properties determined by any one of the shear rate, shear force and evaporation temperature of the solution process, and the substrate is a flexible substrate.

In yet another aspect of the present disclosure, there is provided an electronic device including the metal film obtained by the above-mentioned method, wherein the electronic device is a flexible device, and the metal film may be an electrode of the electronic device.

The liquid metal according to an embodiment of the present disclosure includes particles surrounded with a polymer film. In this case, it is possible to control the thickness by adjusting the conditions of a solution process, to maintain high resolution, and to allow a large-area process. In addition, the liquid metal has stability against external conditions by virtue of the stability of the polymer film. Further, the liquid metal ink prepared for the solution process can form a thin film on various types of substrates and can transfer a pattern to various materials.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
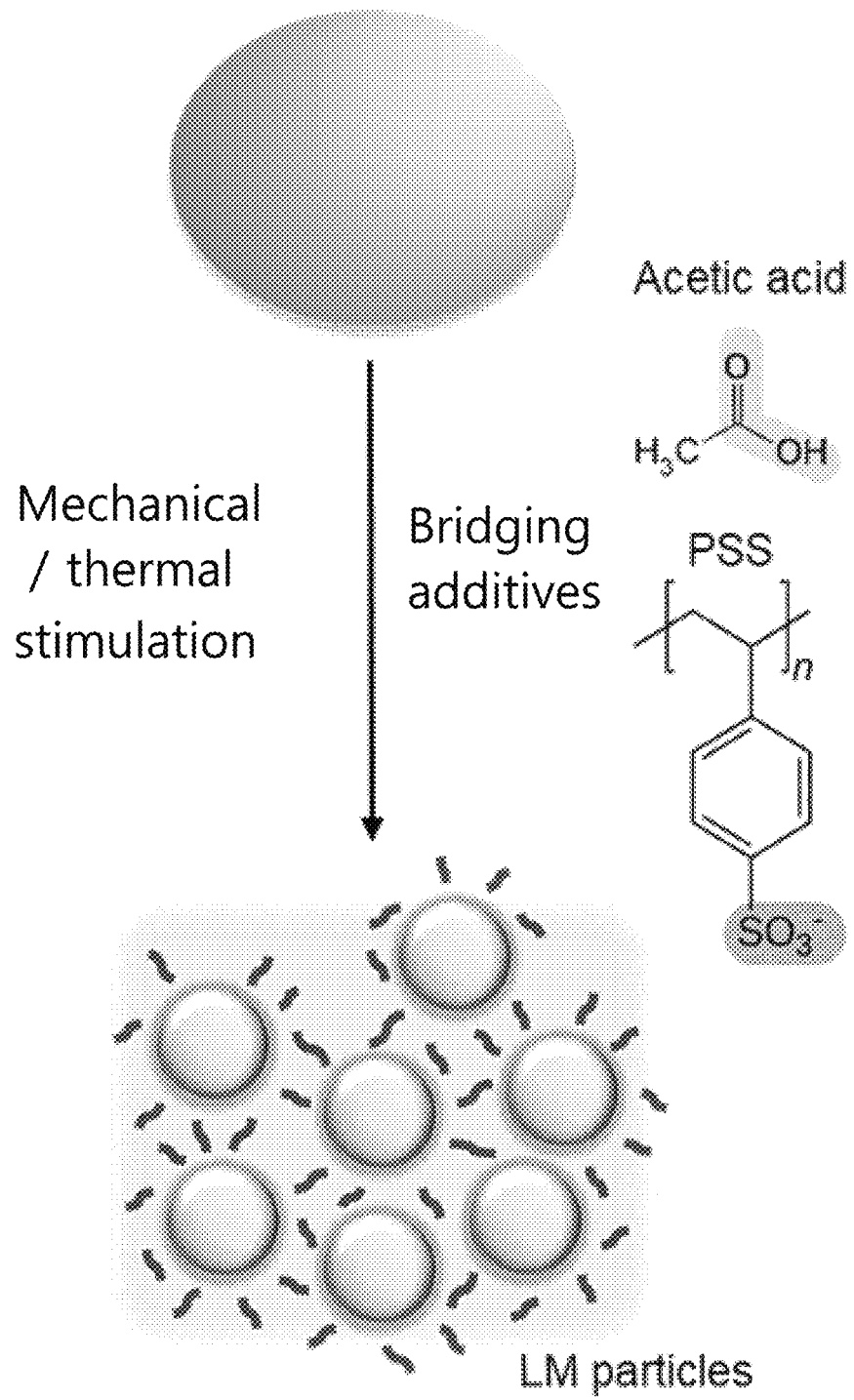
FIG. 1 is a schematic diagram of a liquid metal and a method of manufacturing the same according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, preferred embodiments of the liquid metal according to the present disclosure, a method for preparing the same and an electronic device including the same will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein and the constitution shown in the drawings are just preferable examples for the purpose of illustrations only, not intended to limit the scope of the disclosure, so it should be understood that other equivalents and modifications could be made thereto without departing from the scope of the disclosure.

In one aspect of the present disclosure, there are provided liquid metal precursor particles having a structure including metal particles surrounded with a polymer film, and a precursor solution including the liquid metal precursor particles mixed with a solvent. As used herein, 'metal precursor particle' includes metal particles coated actually on a substrate through a solution process, and a polymer film on the surface thereof. In addition, 'liquid metal precursor solution' means a solution including the precursor particles dispersed in a solvent. Further, 'surrounded with' refers to a state in which the polymer film covers the surfaces of metal particles in such a manner that the metal particles may retain a dispersion state in the solution sufficiently by the polymer film covering the metal particles.

A solid-state thin film obtained from the liquid metal precursor solution prepared according to an embodiment of the present disclosure includes metal particles including gallium indium having a gallium oxide film formed on the surface thereof by ultrasonication, and a polymer film covering the same. In addition, the film is formed on a substrate through a solution process.

Example

An ink containing liquid metal (LM) particles was prepared as shown in FIG. 1. At first, eutectic GaIn-based liquid metal and polystyrenesulfonic acid (PSS, molecular weight (MW): 70,000 g/mol) were dispersed in deionized water (DI) containing 5% acetic acid (AA) by sonication. Here, the sonication can provide mechanical and thermal energy that induces the formation of liquid metal particles covered with a gallium oxide layer.

FIG. 1 is a schematic view illustrating the liquid metal according to an embodiment of the present disclosure and a method for preparing the same.

Referring to FIG. 1, liquid metal (LM, eutectic GaIn) and a polymer electrolyte (polystyrene sulfonate, PSS) are introduced to a solvent (acetic acid, 5 vol %), and ultrasonication is carried out to prepare a liquid metal precursor solution. The liquid metal precursor solution according to an embodiment of the present disclosure includes metal precursor particles including metal particles and a polymer film surrounding the metal particles, and a solvent, wherein the polymer film and the solvent have functional groups that show electrostatic repulsion force to each other in a solution so that the metal precursor particles may have high dispersibility in a solution. Further, the particle size is determined depending on the time of ultrasonication.

In FIG. 1, the metal precursor particles maintain high dispersibility in the solution through the repulsion between sulfonate and carboxylate.

In addition, the particle size controlled depending on the time of ultrasonication is one of the effects of the method according to the present disclosure. Particularly, it is possible to obtain desired conductivity and physical properties by controlling the particle size.

The polymer electrolyte, PSS, used according to an embodiment of the present disclosure functions to interact with and be connected to the polymer film of the particles. In addition, the solvent with acidic environment contributes to homogeneous distribution of particles. When some factors, including ultrasonication time and amount of additives, are satisfied, suitable liquid metal ink can be obtained.

PSS, which is a polymer electrolyte used in an embodiment of the present invention, plays a role to interact with the oxide film of the particle, leading to uniform dispersion of LM particles. Furthermore, when factors such as the ultrasonic treatment time and the amount of additives are satisfied, the liquid metal ink for large-area solid-state liquid metal film can be prepared.

Although the foregoing is described below, the scope of the present invention is not limited thereto.

Embodiment

Figure 2:
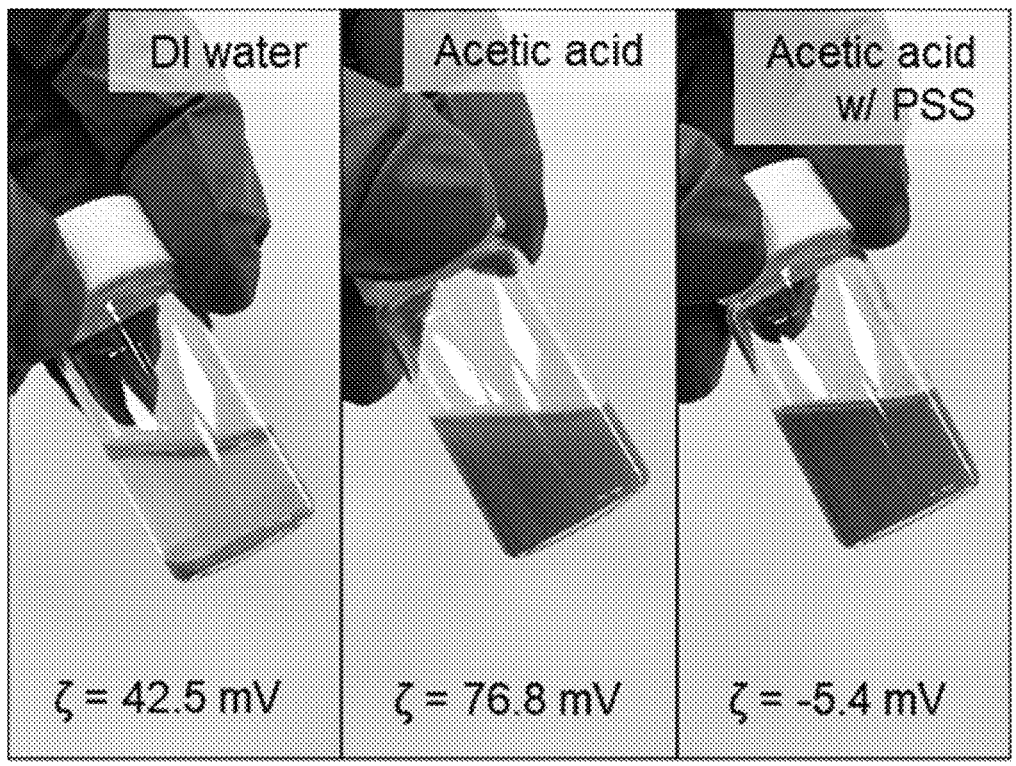
FIG. 2 is a diagram showing photographs and zeta potential values of inks having different components.

FIG. 2 are photographs and zeta potential values of LM dispersed in DI (left), DI/AA (middle), and DI/AA/PSS (right). In this embodiment, AA, PSS stand for acetic acid and polystyrene sulfonic acid, respectively.

According to FIG. 2, DI by itself does not effectively disperse the LM, as evident by the near transparency of the solution and the sedimentation of LM at the bottom of the container. However, with the addition of AA, the solution became turbid with a gray color, confirming the dispersion of LM in the solution. As previously been reported, this can be attributed to the carboxylic acid group in the AA.

This result can be attributed to the carboxylic acid group of AA. Also, the zeta potential of the liquid metal particles increased from +42.5 mV to +76.8 mV due to the increased acidity of the solution, and such an increase may enhance the electrostatic coupling of PSS to LM particles. With the inclusion of PSS in the solution, the zeta potential was a negative value at −5.4 mV, suggesting that the PSS (known as negatively charged polyelectrolyte) is surrounding the LM particles.

That is, such an interaction also induces the bridging of LM particles via PSS, as schematically depicted in FIG. 1. The ink without and with PSS behaved differently upon the addition of HCl. Since HCl dissolves the gallium oxide layer, in the case of ink without PSS, all of the LM particles merged into one large LM droplet in the solution.

Figure 3:
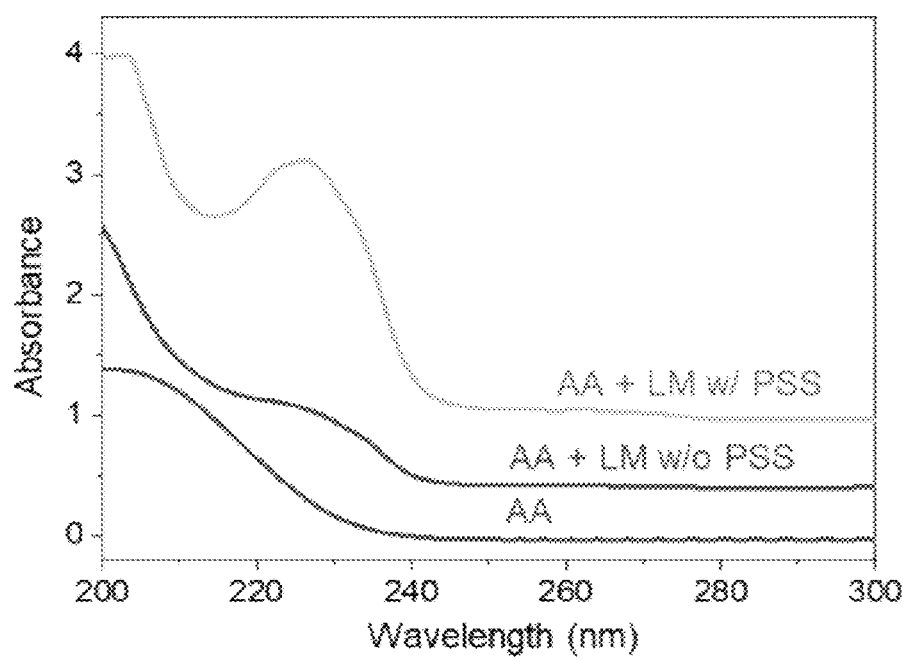
FIG. 3 is a result of UV-Vis absorption analysis.
Figure 4:
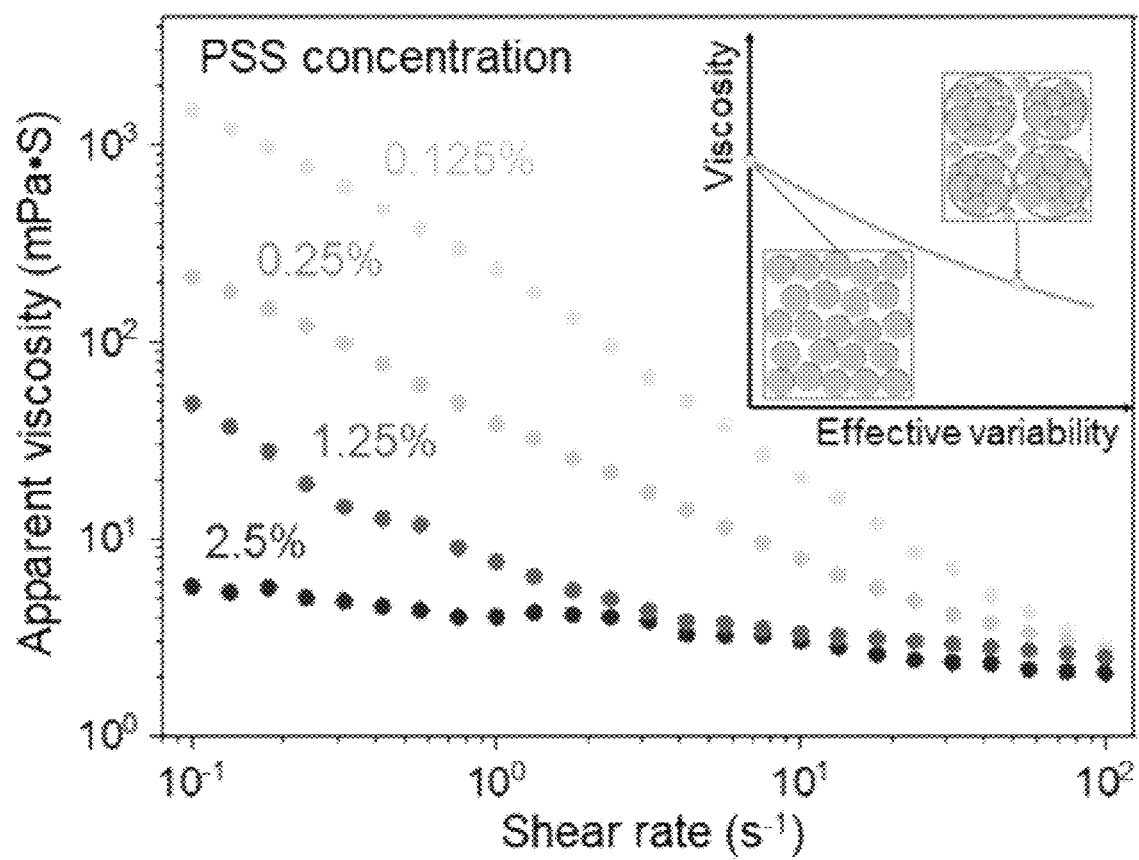
FIG. 4 is a result of measuring viscosity as a function of shear rate to study the rheological behavior of liquid metal ink (DI/AA/PSS).

FIG. 3 are UV-Vis spectra of three different solutions: pure DI/AA solvent without LM, LM dispersed in DI/AA, and LM dispersed in DI/AA/PSS. The change in the absorption peak at 200~240 nm with the addition of PSS indicates a coupling reaction between LM particles and bridging polymer FIG. 4 are apparent viscosities according to a shear rate of LM inks with different PSS concentrations. Inset is a conceptual depiction of viscosity as a function of particle size variability in the suspension According to FIG. 4, with increasing PSS concentration, the apparent viscosity decreased. Previous studies indicate that with higher variability in particle size, the viscosity decreases (inset of FIG. 4)

Figure 5:
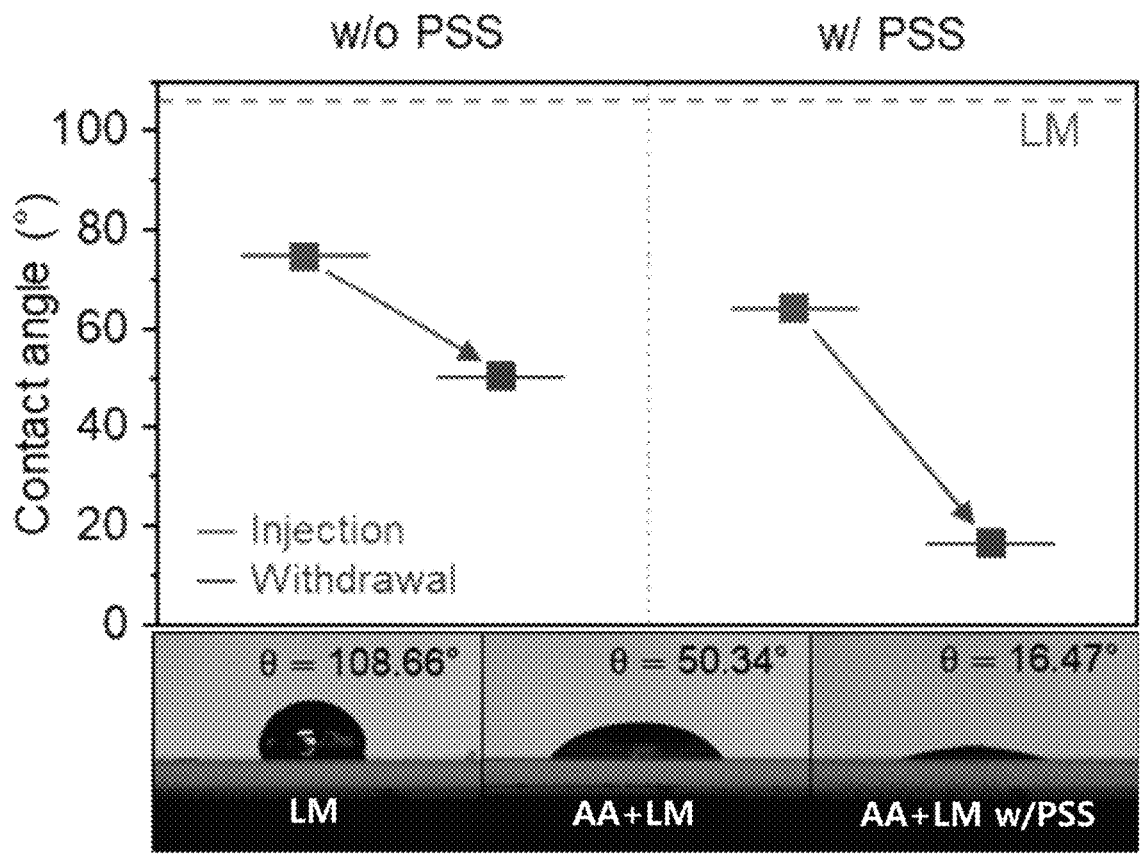
FIG. 5 is a result of measuring the contact angle of the ink according to the present invention.

FIG. 5 are contact angles of LM ink droplet without (left) and with (right) PSS before (blue) and after partial ink withdrawal (red). The contact angle of bare LM is presented as a black dotted line. Bottom photographs are droplet images with contact angles after withdrawal.

According to FIG. 5, Firstly, the contact angle of 50 µl droplet was measured; subsequently, 25 µl was withdrawn from the droplet and the contact angle was measured again. The ink without PSS exhibited contact angle of 74.61° and 50.34° before and after ink withdrawal, respectively; whereas, that of the ink with PSS exhibited contact angle of 63.99° and 16.47°, respectively. The droplet with PSS did not decrease in diameter after ink withdrawal (i.e., the droplet was pinned), which was the reason for the larger decrease in contact angle. On the contrary, for the droplet without PSS, the decrease in contact angle was not as large due to the decrease in diameter upon ink withdrawal. This result suggests that PSS acts as a surfactant that decreases the interfacial energy between the ink and the substrate, which enhances the wettability of ink. Such a forced wetting property of PSS-incorporated LM ink enables the formation of uniform liquid layer and thin-film during solution shearing, as described below.

Figure 6:
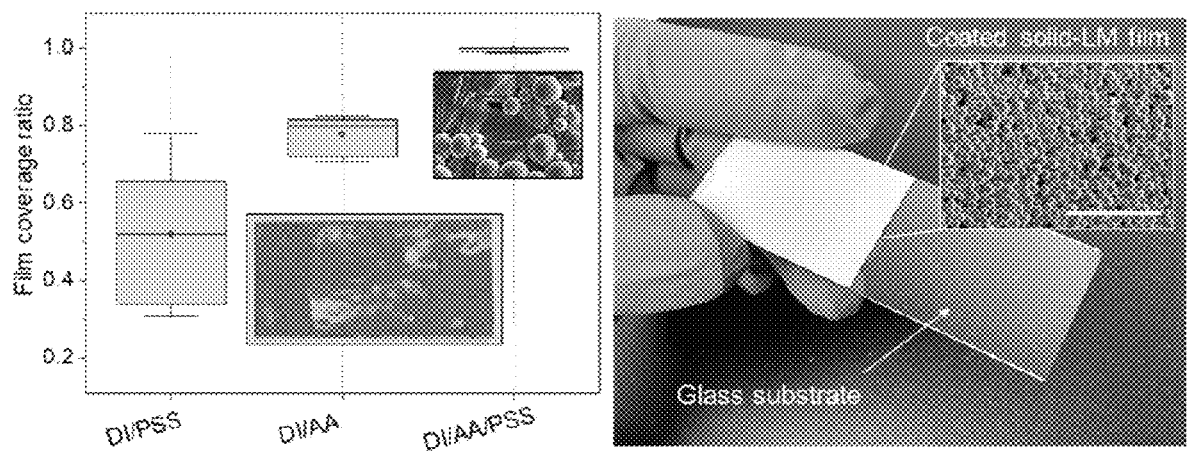
FIG. 6 is a coverage ratio (left) and film photograph (right) of a solution layer SSLM film for three liquid metal inks (DI/PSS, DI/AA, DI/AA/PSS).

FIG. 6 shows coverage ratios (based on multiple samples for each ink) of solution-sheared SSLM (Solid-State Liquid Metal) films for three different LM inks: DI/PSS, DI/AA, DI/AA/PSS.

According to FIG. 6, DI/PSS had the lowest coverage and uniformity, likely due to poor dispersion of LM particles in ink. DI/AA exhibited improved coverage and uniformity; however, the coverage was still incomplete. This can be attributed to the lack of forced wetting ability and self-assembly of LM particles in the absence of bridging polymers. Furthermore, without PSS, rupturing and reduction of LM particles was frequently observed, which rendered it difficult to conduct the lift-off process, as we will describe below.

DI/AA/PSS generated a completely covered and uniform SSLM film (right of FIG. 6), which can be ascribed to well-dispersed LM particles and the bridging between them that aids their self-assembly during thin-film formation.

Figure 7:
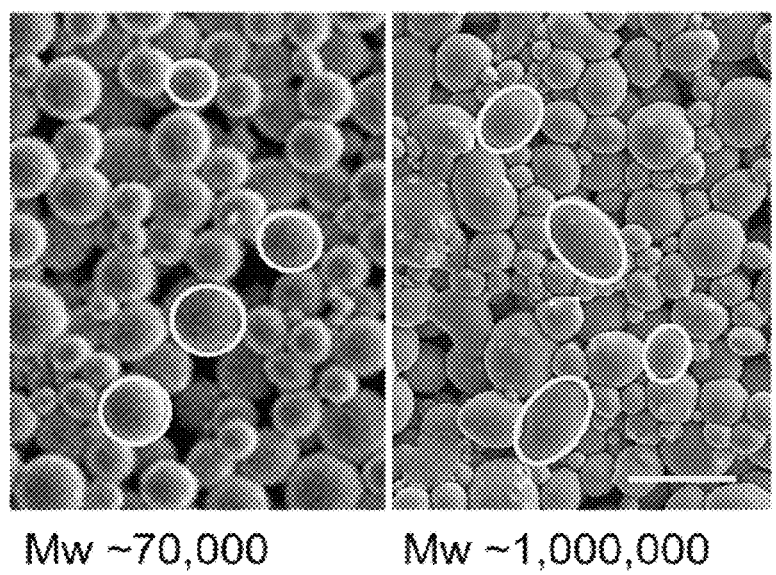
FIG. 7 is an SEM image of SSLM films having different molecular weights (MW) of SS.
Figure 8:
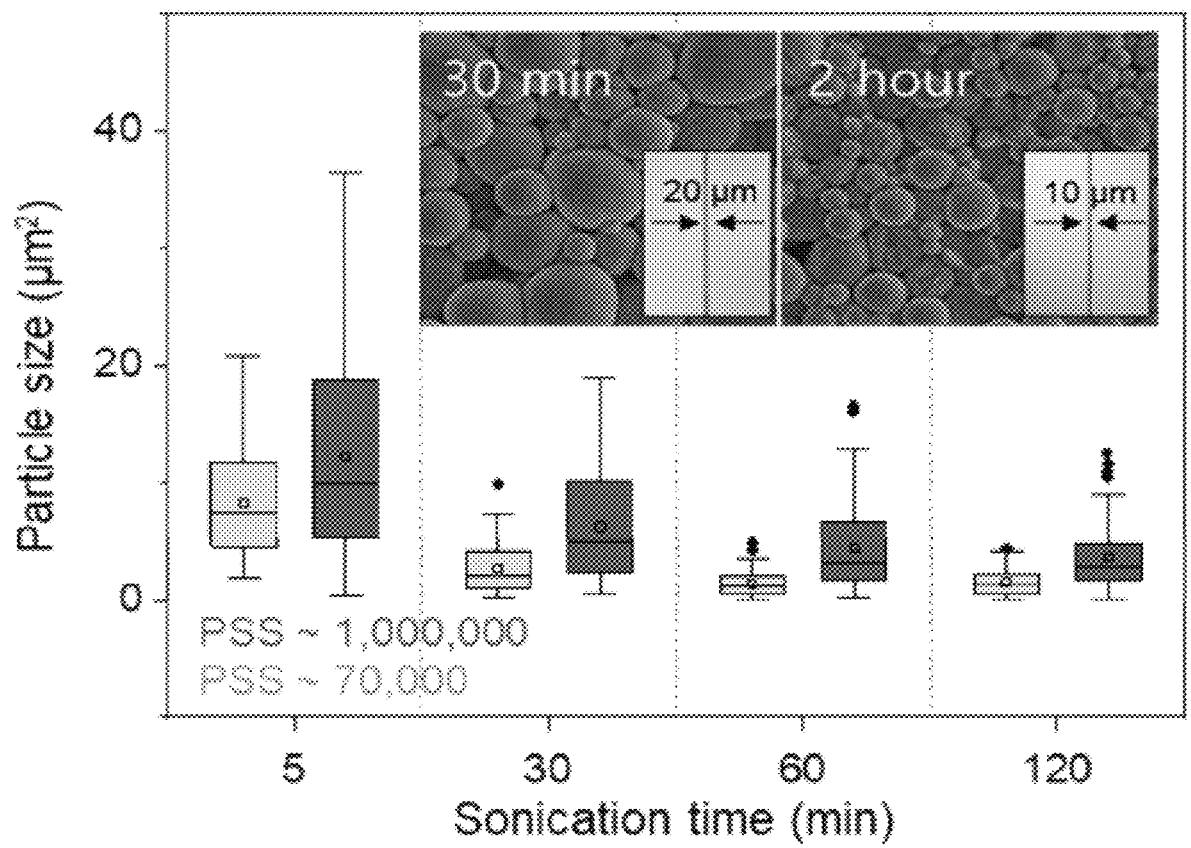
FIG. 8 is a diagram showing particle size distribution of inks having two different PSS MWs at various ultrasonic times

FIGS. 7 and 8 are representative SEM images and particle size distribution as a function of sonication time, respectively, for the SSLM films generated with two different MW of PSS: 70,000 and 1,000,000 (the two LM solutions contained the same molarities of PSS).

According to FIGS. 7 and 8, in the case of larger MW PSS film, non-spherical LM particles were commonly observed, where the interfacial area between the particles was relatively large. On the other hand, for low MW PSS film, the LM particles were dominantly spherical. Such a difference in film morphology can be attributed to reduced surface energy and stronger inter-particle attraction of the LM particles with the longer polyelectrolyte chains. Moreover, as evident in FIG. 8, the average LM particle size can be tuned via sonication time.

Also, the inset of FIG. 8 confirms that with reduced average LM particle size, smaller features can be attained. We have determined that to attain a 10 μm line width, an average particle size of ~3.69 μm$^2$ is required.

Figure 9:
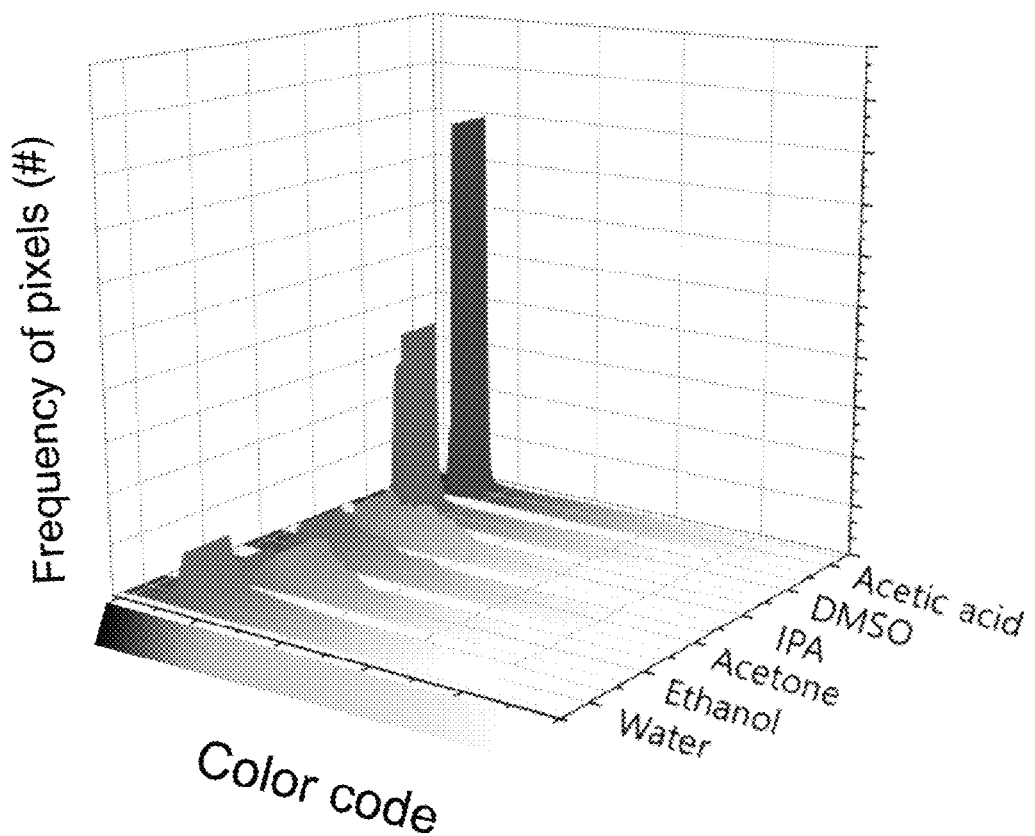
FIGS. 9 and 10 are diagrams showing gray-scale color distributions of optical images and SEM images of solution-layer SSLM films produced with different solvents, respectively.
Figure 10:
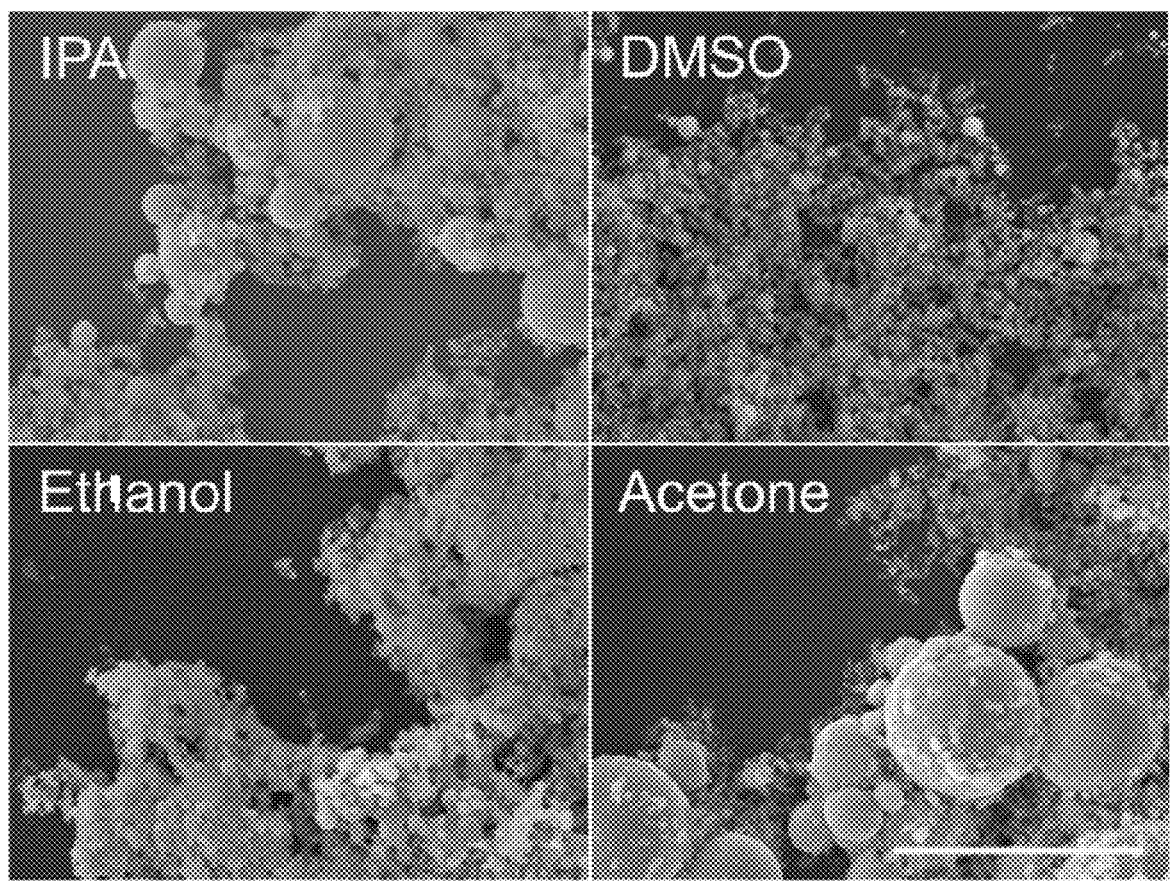

FIGS. 9 and 10 are the grey-scale color distribution of optical images and SEM images, respectively, of solution-sheared SSLM films generated with different solvents.

According to FIGS. 9 and 10, the narrow distribution in the pixel color in the case of AA is an indication of uniform SSLM film and is visually verified in FIGS. 9 and 10. The other solvents, on the contrary, yielded poor uniformity, as evident by the broad pixel color distribution and the SEM images. Furthermore, rupturing of LM particles was observed in the films made with the other solvents. In the case of DMSO and acetone, since solvents damage the photoresist (PR), lithographical patterns could not be achieved.

SSLM (Solid State Liquid Metal) Film on Large Area Through Solution Shearing

Figure 11:
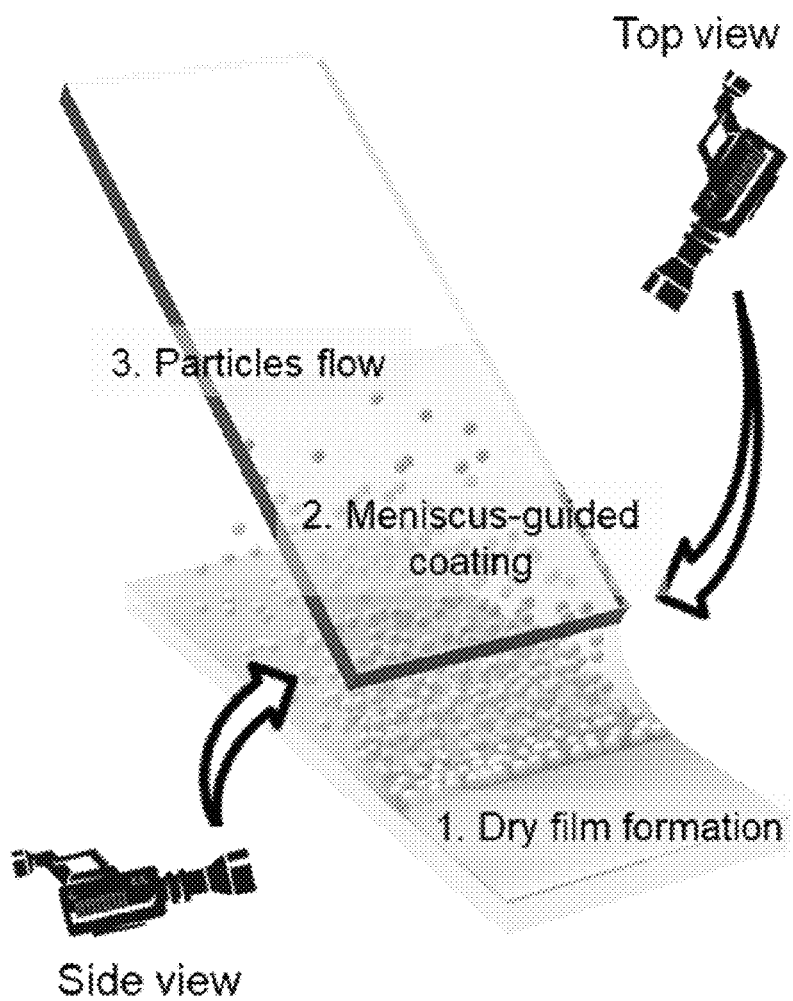
FIG. 11 is a schematic diagram of an SSLM thin film manufacturing process based on a solution shearing method using ink according to the present invention.

FIG. 11 is a schematic representation of SSLM thin-film formation using solution shearing. Solution shearing is a technique analogous to blade coating, where the solution is sandwiched between a heated substrate and a moving blade. A meniscus (curved liquid-air interface) naturally forms between the blade and the substrate, and as the blade moves, thin-film is deposited across the substrate via liquid-to-solid transition occurring near the edge of the meniscus, i.e., contact line (substrate-solution-air interface). Solution shearing enables accurate control of fluid dynamics and localizes the solvent evaporation at the meniscus, enabling uniform coating and precise tuning of thin-film properties such as packing density and film thickness.

To describe the method according to an embodiment of the present invention in more detail, first, the LM ink contains 1.4 g of gallium indium (EGaIn, Rich-Metals, China), 7×10−8 moles of PSS (average molecular weight 70,000 and 1,000,000 two types are used) were mixed in an acidic solvent (acetic acid) of 5 vol % diluted in water and subjected to ultrasonic treatment (VC 505, Sonics & Materials) for 30 minutes. A gallium oxide film is formed on the surface of the granulated gallium indole by ultrasonic treatment. After that, for the solution process, the substrate was treated with oxygen plasma (CUTE, Femto Science) for 1 minute at 100 W. 100 μl of liquid metal ink was injected between the blade and the substrate, and the substrate was moved at various speeds to form a thin film by a solution shearing process at 70° C. During solution shearing process, the angle between the blade and the substrate was 5 degrees, and the distance was maintained at 200 μm.

Figure 12:
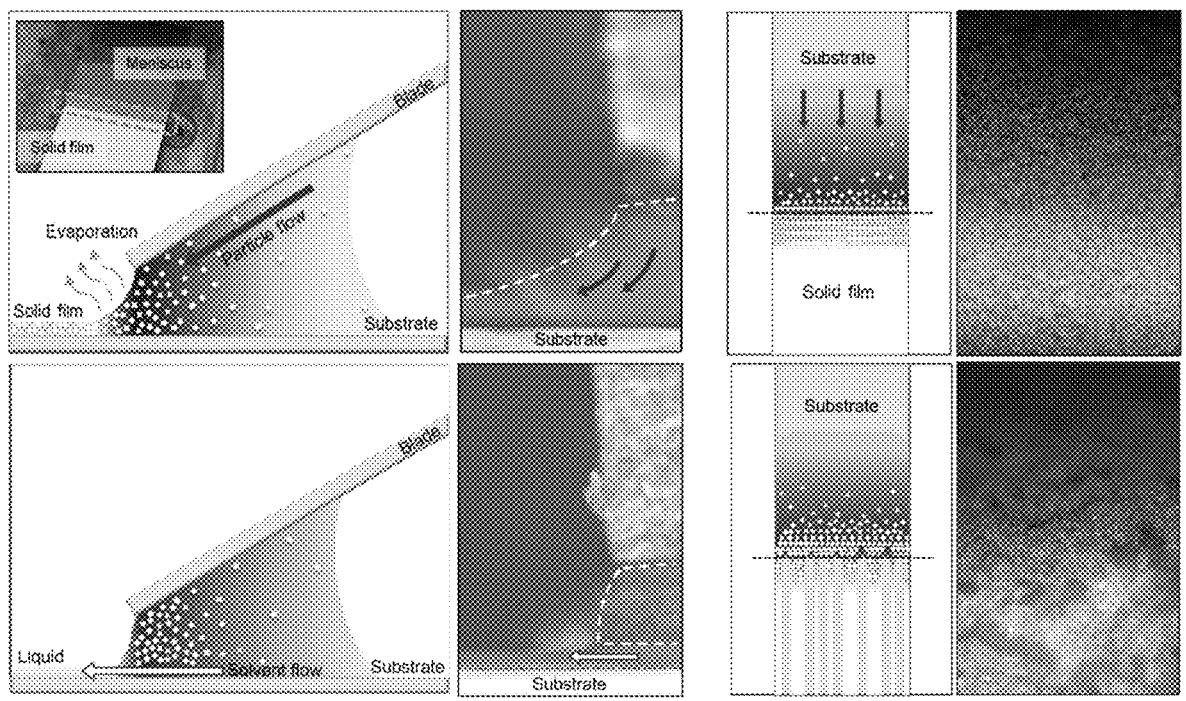
FIG. 12 is a plan view and a side schematic view and a video image, in which an SSLM thin film acting as seed particles is present on the upper side, and a photograph when the SSLM thin film is not present on the lower side.

FIG. 12 are side and top view schematic and video images of the meniscus near the contact line in the presence and absence of pre-existing SSLM thin-film acting as seed particles (i.e., seed film), respectively. The top in FIG. 12 is the case where the SSLM thin film is present, and the bottom is the case where it does not exist Referring to FIG. 12, it can be seen from the top of FIG. 12 that the liquid metal particles move rapidly toward the contact line, and continue to grow as a seed film after being packed. However, on the contrary, the bottom of FIG. 12 shows that the liquid metal particles are agglomerated at the blade boundary, which results in non-uniform shear coating. Therefore, these results suggest that the interaction between liquid metal particles has a great effect on the solution shearing process.

Figure 13:
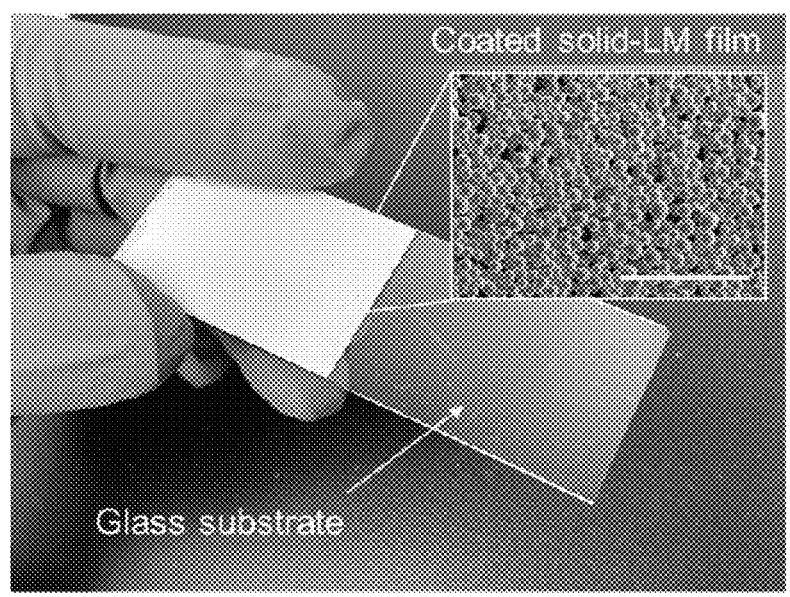
FIG. 13 is a photograph of the actually manufactured thin film.

FIG. 13 is a photograph of the actually manufactured thin film.

Referring to FIG. 13, a thin film of FIG. 12 can form when a solution shearing process using the PSS-coated liquid metal particle ink is adopted.

Figure 14:
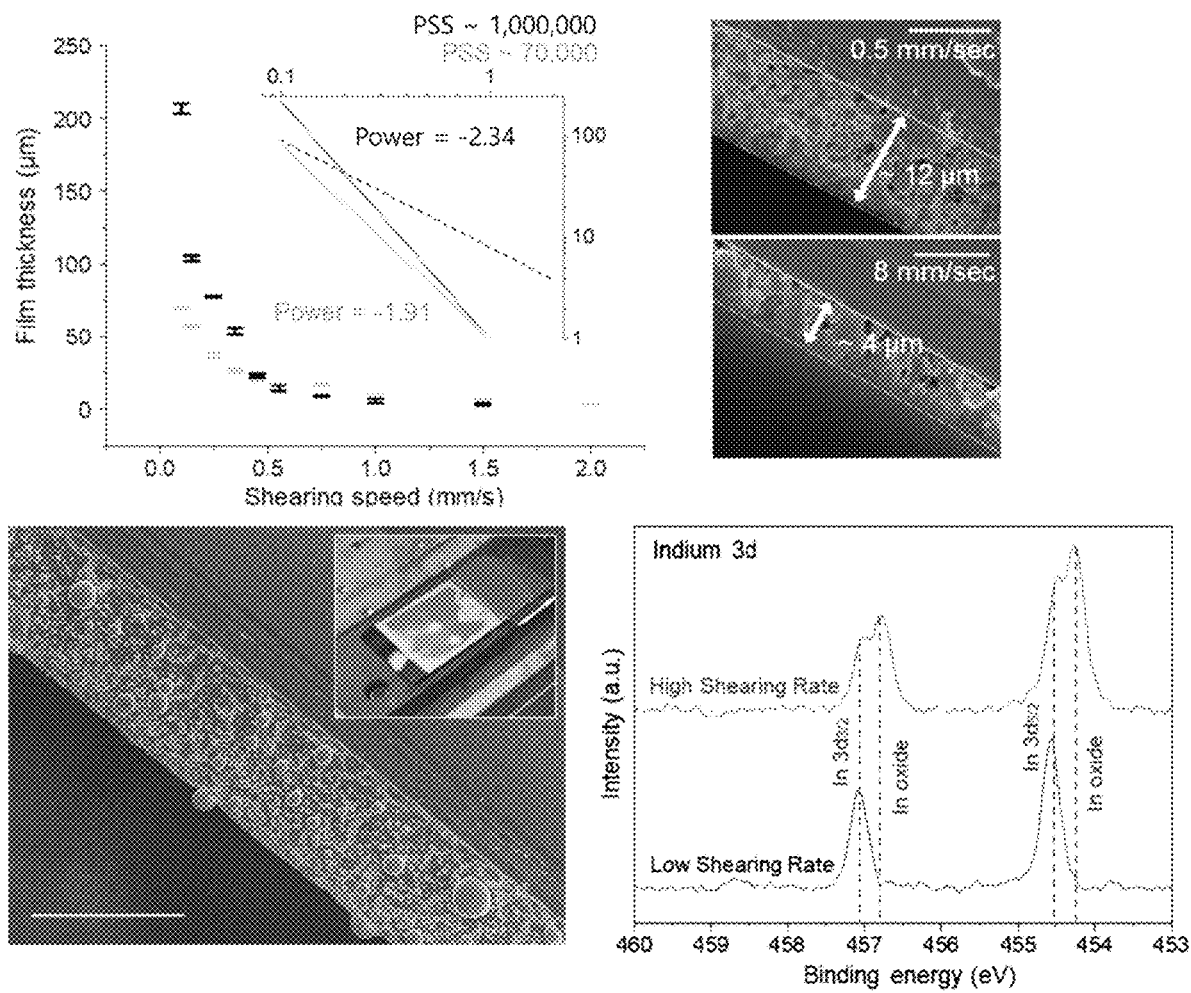
FIG. 14 is a diagram illustrating parameters and results related to solution process optimization according to an embodiment of the present invention.

FIG. 14 is a diagram illustrating parameters and results related to solution process.

Referring to FIG. 14, the film thickness and the like vary according to the PSS molecular weight. In particular, it can be seen that the density of the film varies according to the shear rate. This indicates that the density and pattern of the film can be controlled independently depending on the molecular weight and the solution process conditions.

In the method for manufacturing a thin film according to an embodiment of the present invention, the thickness of the thin film varies with the shear rate. The leftmost graph of FIG. 14 is a graph of a portion in which the thickness is decreased.

In addition, a difference in the slope of the thickness decrease can be seen depending on the molecular weight of PSS. In the case of LM ink containing PSS (number average molecular weight 1,000,000), LM particles becomes elliptical due to the greater attractive force, leading to thicker film that the film made from LM ink containing PSS with number average molecular weight 70,000. The result shows that the thickness of file varies with the molecular weight of PSS.

Therefore, when the precursor according to the present invention is used, there is an advantage that a metal film having a desired thickness and pattern can be formed by controlling molecular weight, shear rate, and the like.

In addition, the present invention can also control the surface pattern of the metal film according to the shear rate. For example, referring to the middle and right figures of FIG. 14, if the shear rate increases and the thickness increases again, the shape of the thin film and the particle shape changed, resulting in the loss of morphology.

Figure 15:
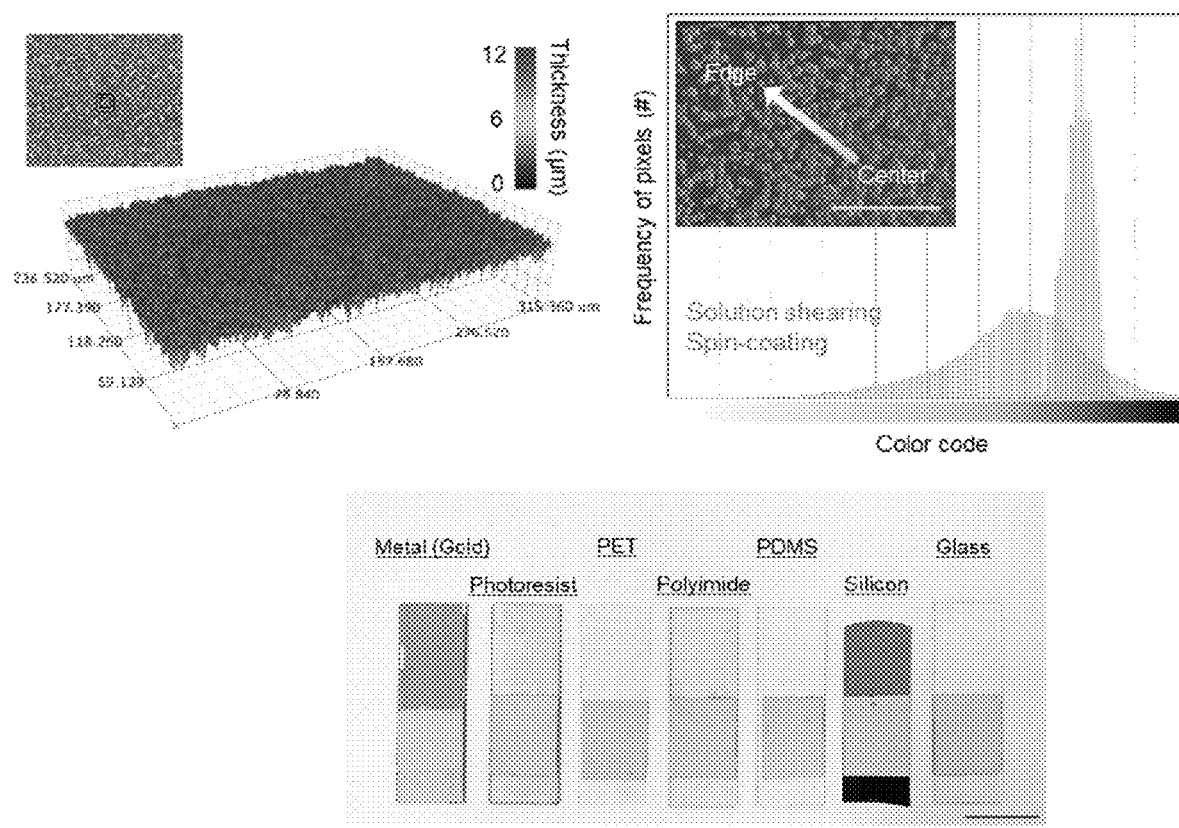
FIG. 15 is an analysis result of a metal film formed by a liquid metal-based solution process according to an embodiment of the present invention.

FIG. 15 is an analysis result of a metal film formed by a liquid metal-based solution process according to an embodiment of the present invention.

Referring to FIG. 15, it can be seen that the 3D profiler image of the thin film shows high uniformity (left figure), and the solution process according to the present invention shows significantly higher uniformity compared to the conventional spin process (middle figure). In addition, it can be seen that the solution process-based metal film according to the present invention can be applied to all kinds of substrates (right figure). Given this, the liquid metal-based metal film according to the present invention has the advantage that it can be applied to a flexible device.

Figure 16:
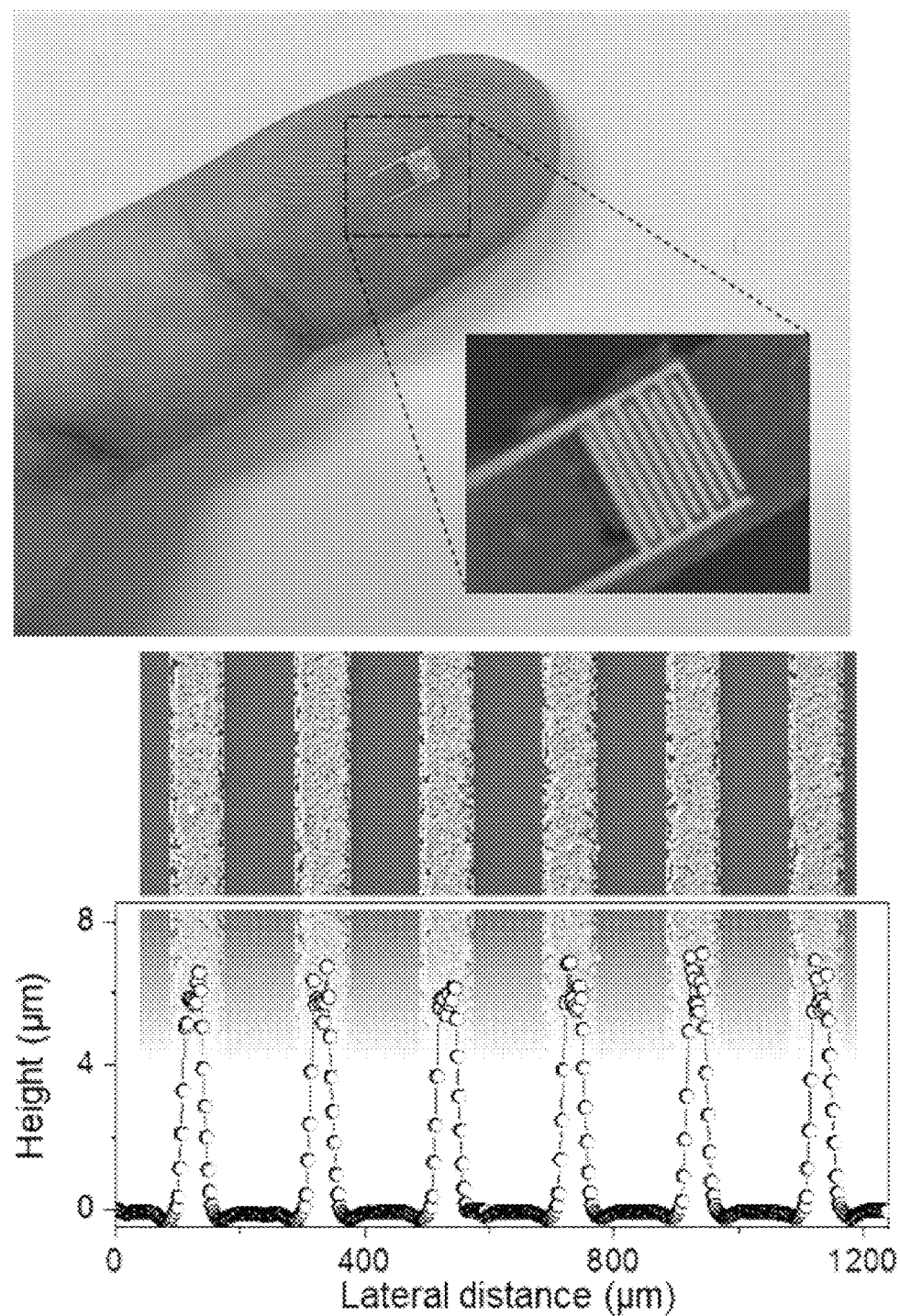
FIG. 16 is a photograph of a thin film patterned using a MEMS process.
Figure 17:
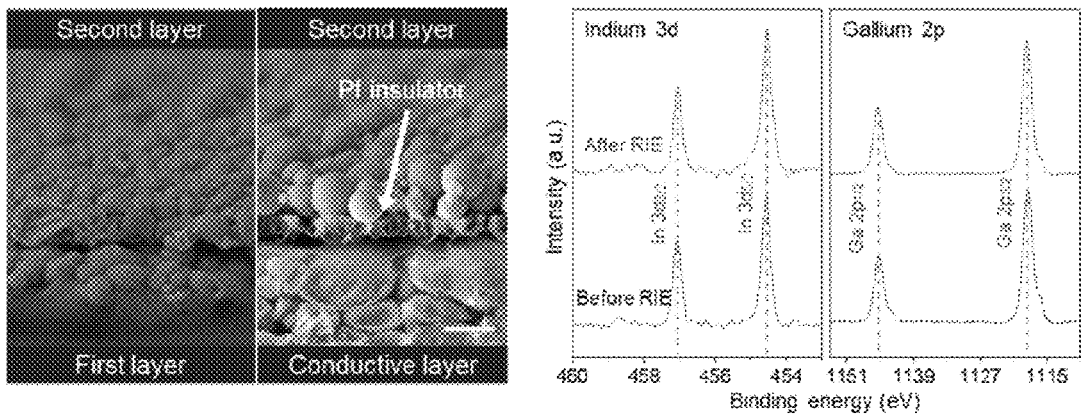
FIG. 17 is a photograph of a thin film formed according to a lamination method.

FIG. 16 is a photograph of a thin film made with MEMS process, and FIG. 17 is a photograph of a thin film according to a lamination method.

Referring to FIGS. 16 and 17, it can be seen that a pattern with high resolution and a multilayer thin film having a stacked structure can be formed through the solution process with the LM ink according to the present application. Also, it can be seen that the properties of the film are stable enough that there is no change even after experiencing strong chemical process such as Reactive ion etching (RIE).

Figure 18:
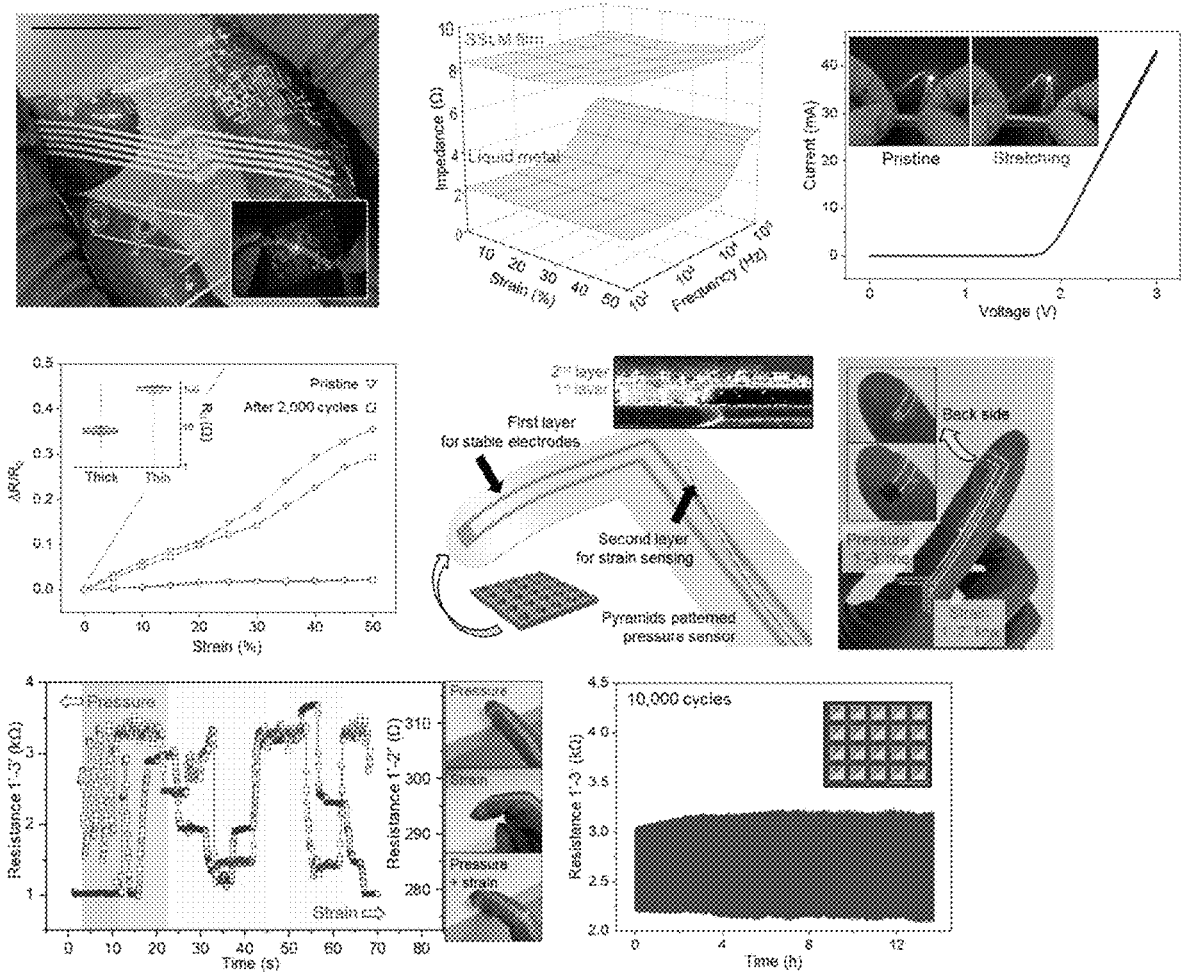
FIG. 18 is a result of applying a metal film formed by a solution process according to the present invention to a flexible device.

FIG. 18 is a result of a metal film formed by a solution process according to the present invention when applied to a flexible device.

Referring to FIG. 18, according to the present invention, LED turns on when connected to the metal film made by the present invention. Also, the present invention can be available even to elongated substrate. This means that the solution process-based metal film according to the present invention can be substantially applied to a flexible device.

Figure 19:
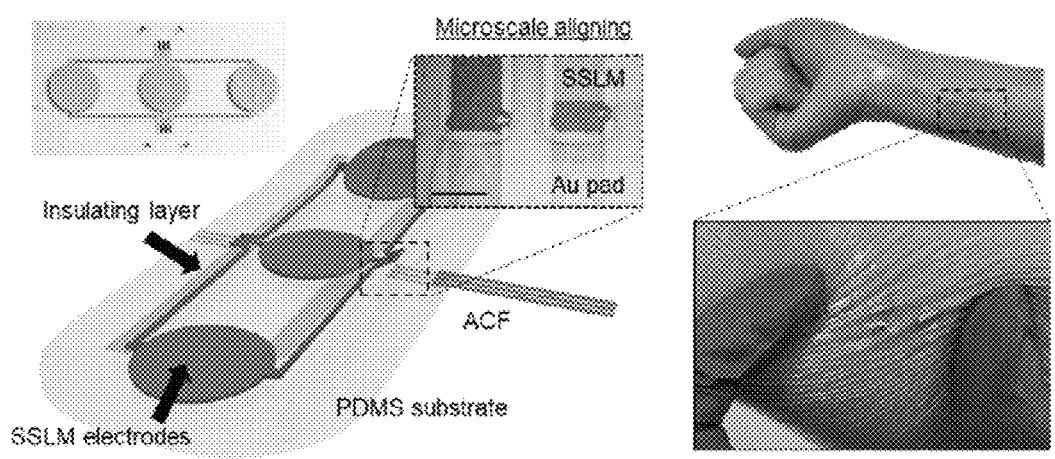
FIG. 19 is a diagram showing a result of using a metal film prepared according to an embodiment of the present invention as an electrode.
Figure 19:
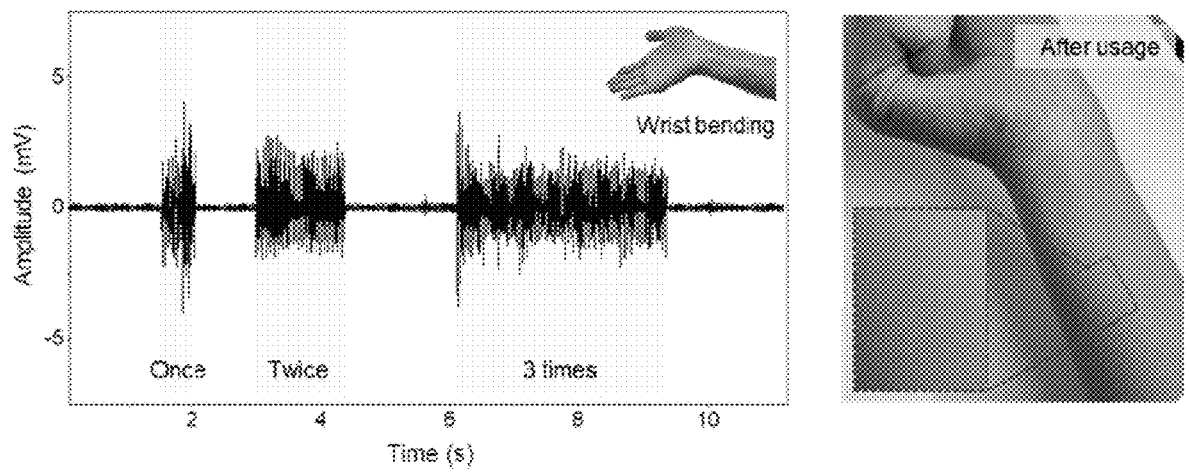

FIG. 19 is a diagram showing a result of using a metal film prepared according to an embodiment of the present invention as an electrode.

Referring to FIG. 19, it can be seen that an electrode of an EMG sensor that can measure muscle movement can be implemented as another application of the present invention, and that the electrode maintains its original shape and performance even if it is twisted or stretched after being attached to the skin. In addition, since the solid state thin film developed in the present invention has high stability, there is an advantage that no residue is left even if it is attached to the skin and then detached.

As described above, the liquid metal according to the present invention includes particles surrounded by a polymer film, and in this case, the thickness can be adjusted by adjusting the solution process conditions, and a large-area process is possible while maintaining high resolution. In addition, there is stability to external conditions due to the stability of the polymer film, and the liquid metal ink prepared for the solution process can form a thin film on various types of substrates and transfer patterns to various materials.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A liquid metal precursor solution, comprising:
    metal precursor particles comprising metal particles and a polymer film surrounding the metal particles; and
    a solvent mixed with the metal precursor particles,
    wherein each of the polymer film and the solvent comprises a functional group having electrostatic repulsion force to each other so that the metal precursor particles may be dispersed in the solvent,
    wherein the polymer film comprises sulfonate, and the solvent comprises carboxylate.

2. The liquid metal precursor solution of claim 1, wherein the polymer film comprises polystyrene sulfonic acid (PSS), and the solvent comprises acetic acid (AA).

3. A method for preparing the liquid metal precursor solution as defined in claim 1, comprising the steps of:
    mixing the metal particles and a polymer electrolyte with the solvent to provide a mixed solution; and
    subjecting the mixed solution to ultrasonication,
    wherein the metal precursor particles have a size determined depending on the time of ultrasonication.

4. The method for preparing the liquid metal precursor solution of claim 3, wherein the metal particle is gallium indium, and the polymer film is polystyrene sulfonate (PSS).

5. A method for manufacturing a metal film, comprising the steps of:
    coating the metal precursor solution of claim 1 on a substrate through a solution process; and
    carrying out evaporation of the solvent of the coated metal precursor solution,
    wherein the metal precursor solution comprises metal particles and a polymer film surrounding the metal particles, the polymer film comprises sulfonate, and the solvent comprises carboxylate.

6. The method for manufacturing a metal film of claim 5, wherein the solution process is a solution shear process.

7. The method for manufacturing a metal film of claim 5, wherein the metal film has physical properties determined by any one of the shear rate, shear force and evaporation temperature of the solution process.

8. The method for manufacturing a metal film of claim 5, wherein the substrate is a flexible substrate.

9. An electronic device comprising the metal film obtained by the method of claim 5.

10. The electronic device of claim 9, which is a flexible electronic device, and the metal film is an electrode of the electronic device.

* * * * *